United States Patent [19]

Prussas

[11] Patent Number: 4,687,290
[45] Date of Patent: Aug. 18, 1987

[54] PROTECTIVE TUBE ARRANGEMENT FOR A GLASS FIBER

[75] Inventor: Herbert Prussas, Reichertshausen, Fed. Rep. of Germany

[73] Assignee: Siemens Aktiengesellschaft, Berlin and Munich, Fed. Rep. of Germany

[21] Appl. No.: 701,974

[22] Filed: Feb. 15, 1985

[30] Foreign Application Priority Data

Feb. 17, 1984 [DE] Fed. Rep. of Germany ....... 3405805

[51] Int. Cl.⁴ .......................... G02B 7/26; G02B 7/00
[52] U.S. Cl. ............................. 350/96.20; 350/96.23
[58] Field of Search .............. 350/96.15, 96.20, 96.21, 350/96.23, 96.29, 96.30

[56] References Cited

U.S. PATENT DOCUMENTS

| | | | |
|---|---|---|---|
| 4,039,248 | 8/1977 | Franke et al. | 350/96.30 X |
| 4,065,203 | 12/1977 | Goell et al. | 357/30 X |
| 4,119,363 | 10/1978 | Camlibel et al. | 350/96.2 |
| 4,153,332 | 5/1979 | Longini | 350/96.23 |
| 4,166,668 | 9/1979 | MacLeod | 350/96.20 |
| 4,232,935 | 11/1980 | Rohner et al. | 350/96.23 |
| 4,295,707 | 10/1981 | Nakai et al. | 350/96.2 |
| 4,385,797 | 5/1983 | Dubois et al. | 350/96.20 |
| 4,548,466 | 10/1985 | Evan et al. | 350/96.20 |

FOREIGN PATENT DOCUMENTS

| | | |
|---|---|---|
| 1108900 | 9/1981 | Canada . |
| 3010820 | 9/1981 | Fed. Rep. of Germany . |
| 3027743 | 2/1982 | Fed. Rep. of Germany . |
| 3109469 | 9/1982 | Fed. Rep. of Germany . |

OTHER PUBLICATIONS

Abstract, Japanese Application 54-74453, published Jun. 14, 1979 English-Language.
English-Language Abstract, Japanese Application 57-100781, published Jun. 23, 1982.

Primary Examiner—Eugene R. Laroche
Assistant Examiner—Steven J. Mottola
Attorney, Agent, or Firm—Hill, Van Santen, Steadman & Simpson

[57] ABSTRACT

A protective tube arrangement particularly useful for positioning the end of a glass fiber relative to an opto-electronic component of a module having a housing, which housing engages the protective tube characterized by the glass fiber being secured to the tube at two axially spaced locations with the length of the fiber extending between the two locations and the distance of the tube between the locations being selected so that the fiber has a greater length than the distance for all temperatures below a maximum temperature limit. Thus, the fiber is not subjected to tensile stresses and the distance between the two locations on the tube and the length of the fiber are selected so that the compressive stresses are below 1 N/mm² for all temperature ranges between the maximum temperature limit and the minimum temperature limit. The method for securing the fiber in the tube can either be by forming both connections simultaneously or in sequence but forming them at a temperature greater than the maximum temperature limit so that after forming the connection and cooling to the maximum temperature limit or therebelow, the fiber between the two connecting locations will not be subjected to tensile stresses.

11 Claims, 3 Drawing Figures

PROTECTIVE TUBE ARRANGEMENT FOR A GLASS FIBER

BACKGROUND OF THE INVENTION

The present invention is directed to an improvement in a protection tube arrangement for a glass fiber, which tube is particularly useful for positioning a fiber in a housing of an opto-electronic module with a tip of the fiber adjacent a component of the module. The tube arrangement includes a glass fiber being positioned in a stiff protection tube with the tube surrounding and protecting the fiber and aligning the fiber with the component. The tube is composed of a metal having a poor thermal conduction and the module has a temperature range for a storage period which is a non-operation and for an operation period, which range is between a maximum or upper temperature limit and a minimum or lower temperature limit.

An arrangement, wherein a fiber is positioned in a tube which projects into a module to position the tip of the fiber to a component is disclosed in U.S. patent application Ser. No. 659,892, filed Oct. 11, 1984, which U.S. application claims priority from German Application No. P 33 37 131.8. It is noted that this application is silent about the thermal conductivity of the protection tube.

The present invention has been specifically developed for an opto-electronic transmission module or, respectively, reception module, of a telecommunications system. Over and above this, however, it is also suited for all opto-electronic modules which are supplied with light signals via a glass fiber or which produce an output light signal which is to be coupled into a glass fiber.

It has been shown that a glass fiber in a protective tube even after it has been secured in a protective tube must be protected against fracture, for example, from excessive longitudinal tensile stresses in the glass fibers and from severe impact load on the protective tube. In addition, because the taper on the end of the glass fiber is usually projected rigidly out of the first tube end of the protective tube only slightly and must be aligned to the optical active location of the opto-electronic component, which is inside of the module housing with a precision that is often extreme, for example, exactly 0.1 $\mu$m, problems with movement of the fiber or tube do occur. For example, care must be taken that the securing of the fiber in the protective tube does not cause a deforming or movement of the fiber because of creep due to a continuous longitudinal tensile stress of the type which would cause the taper to be slowly moved out of the desired position. Thus, a long-time stability of the fiber in the tube is desirable and required.

It has been particularly shown that such dangers for glass fibers and/or their fastenings and for the taper adjustments, are produced not only because of blows but also because of temperature changes. This is because given an increase in the temperature, the protective tube normally expands more than the glass fiber which is suspended between two fastening locations on the tube. This causes excessive tensile stresses to be applied on the fiber.

SUMMARY OF THE INVENTION

The present invention is directed to providing a protective tube arrangement wherein the glass fiber is not subjected to danger and damages because of tensile stresses particularly due to changes in temperature during operation of the device in which the fiber is mounted. The invention accomplishes these aspects without great outlay. To accomplish these goals, the present invention is directed to an improvement in a protection tube arrangement for a glass fiber particularly for providing the fiber in a housing of an opto-electronic module with a tip of the fiber aligned or adjacent an optical component of module, said tube arrangement including a glass fiber being positioned in a stiff protective tube with the tube surrounding and protecting the fiber and aligning the fiber with the component, said tube being composed of a metal having a poor thermal conductivity and the module being operated at a temperature and having a temperature when not being operated which falls within a range of a maximum or upper temperature limit and a minimum or lower temperature limit. The improvement comprises first means for securing the fiber to the tube at a first location and the second means for securing the fiber to the tube at a second location spaced from the first location, said locations on the tube and on the glass fiber being selected with the length of the fiber between the first and second locations being greater than the distance on the tube between the two locations at any temperature below the maximum temperature limit so that the fiber is free of tensile stresses and said length and distance being selected so that at a temperature below the maximum temperature limit and above the minimum temperature limit, the fiber hangs loosely in the tube between the two locations and the only stresses on the fiber are axially directed compression stresses of below 1 N/mm$^2$ so that no triggering of creep occurs over long durations at either of the first or second means for securing.

Additional advantages of the invention are that the distance between the two locations on the tube and the length of the fiber between the two locations is selected to be noticeably more than the critical buckling length of the fiber. This will facilitate a loose buckling of the glass fiber between its two securing locations even given a more pronounced temperature change. Another advantage is that one of the first and second means for securing is a solid, non-elastic securing means such as a solder connection while the other of the first and second means is produced with a highly elastic means for securing such as utilizing silicone rubber. This facilitates an elastic, reversible yielding of one of the securing means preferably positioned away from the taper when the tube arrangement is subjected to even more pronounced temperature changes.

As mentioned hereinabove, the invention is preferably utilized for positioning the glass fiber in a housing of a module having an opto-electronic component which admits light. Thus, the protective tube also functions for positioning the end of the fiber at the desired position relative to the component.

To manufacture or produce the tube arrangement, one of the first and second means for securing can be formed before the other so that the tube can be loosely adjusted. If both securing means are to be simultaneously produced, it is desired to have the tube arrangement elevated above the maximum temperature limit when this is accomplished so that upon cooling to the maximum limit, the fiber will not be under any tensile stresses. For example, if the maximum temperature limit is normally 65° C., the soldering or forming of the securing at the locations can be accomplished at 85° C. so that the maximum operating temperature will always be at a temperature wherein the fiber will not be under tensile stresses.

DESCRIPTION OF THE PREFERRED EMBODIMENTS

Figure 1:
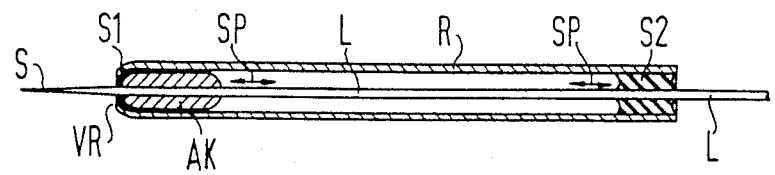
FIG. 1 is a cross-sectional side view of a protective tube arrangement according to the present invention when at a temperature close to the maximum temperature limit.
Figure 2:
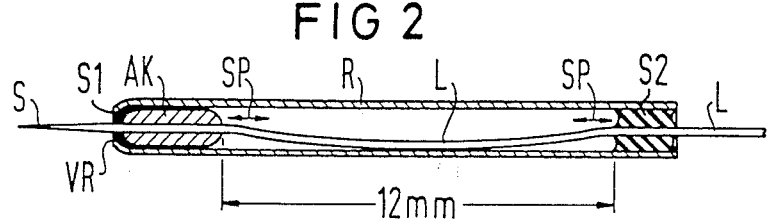
FIG. 2 is a longitudinal cross-sectional view of the protective tube arrangement similar to FIG. 1 wherein the temperature is between the maximum temperature limit and the lower temperature limit.

The principles of the present invention are particularly useful when incorporated into a protective tube arrangement illustrated in FIGS. 1 and 2. The tube arrangement includes a protective tube R which receives an optical fiber such as a glass fiber L which is provided with a taper S at its one tip or end. The glass fiber is secured in the tube R at two spaced locations such as by a first means for securing S1 preferably at a partially closed end VR of the tube R and a second securing means S2 at the opposite end. The tube R surrounds the fiber and aligns the fiber substantially concentric therewith. As illustrated, the taper S extends from the closed end VR which has the first means S1 for securing.

Figure 3:
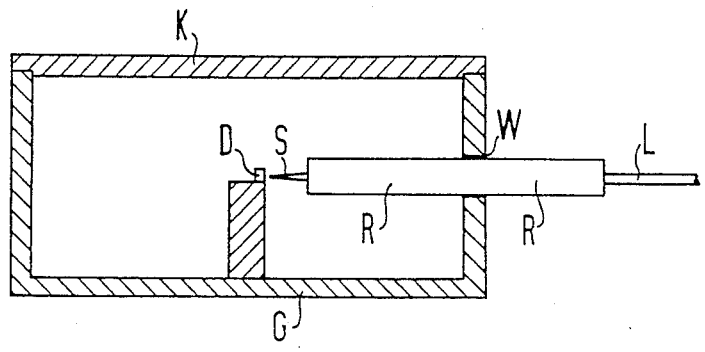
FIG. 3 is a cross-sectional view with portions in elevation illustrating the use of the protective tube arrangement of the present invention in a housing of a module.

As illustrated in FIG. 3, the protective tube R extends through an opening W in a wall of a housing of a module. As illustrated the housing has a can G with a lid K. The tube R, while extending through the opening W, has the taper S aligned with an opto-electronic component D which is positioned within the housing formed by the can G and the lid K.

The protective tube R is preferably composed of a metal which, for example, can have a rather poor thermal conductivity. The protective tube R is then sufficiently rigid so that the taper S in the housing will retain its alignment to the optical active location of the component D independently of the respective three-dimensional attitude of the module housing formed by the can G and the lid K even, for example, with a precision of 0.05 μm or even a greater precision if needed.

As a consequence of warming, the protective tube R expands at a greater rate than the glass fiber section which is secured between the first and second means for securing such as S1 and S2. Given excessive warming to a temperature close to the maximum temperature limit such as illustrated in FIG. 1, the intense longitudinal stresses of a rather tightly stretched fiber might occur. If the fiber L while at the elevated temperature were under stress, then additional stress may occur from a sharp impact which would elevated the longitudinal tensile stress SP to a point to cause a breaking of the fiber. In addition, if the fiber L was under a great stress at the elevated temperature, at least one of the two means S1 and S2 for securing might permanently deform due to a shearing force at a parting surface between the glass fiber L and the securing means, particularly due to creep and/or be completely destroyed. If this occurred, the conducting of light through the fiber would be disrupted particularly the extreme precision of the centering and/or respectively, adjustment of the tapered tip S to the component D would often be destroyed or disappear.

The protective tube arrangement according to the present invention has the fiber connected to the tube at spaced locations for the first and second means S1 and S2. The operating temperature and any storage or non-operating temperature of the device are selected to lie within a temperature range comprising a maximum or upper temperature limit and a minimum or lower temperature limit.

In the invention, the glass fiber is secured to the protective tube R at two spaced locations which preferably lie at the tube ends. In addition, the locations for the first and second securing means are preferably on the inside surface of the protective tube R. In order to avoid fracture of the glass fiber and/or the securing means from deforming, the glass fiber L at any temperature below the maximum temperature limit inventively has a greater length between the two fastening locations for the means S1 and S2 than the distance between the two locations on the tube. For example, the fiber may have a length of 12 mm between the two locations thereon while the tube may only have a length of 8 mm. Thus, the fiber is free of any shear stresses and is only subjected to compressive strains or stresses SP at the operating and storage temperatures. Under the maximum temperature limit and above the minimum temperature limit which occurs after the means S1 and S2 for securing have been formed, the glass fiber will be loosely suspended between the two fastening locations as illustrated in FIG. 2. Thus, the fiber L will have a loosely buckled or sinuous shape so that only longitudinally compressive strains or stresses are applied to the fiber and are, for example, at a stress below 1 N/mm² for the fiber between the two securing means S1 and S2 which may use soldered masses to form the connections. In addition, this loose arrangement is such that no creep will be triggered at either of the means for securing even for extended periods of time. It is particularly desirable that no creep occurs at the first means S1 which is adjacent to the taper S.

To form the securing of the fiber in the tube R, the two securings caused by the securing means S1 and S2 can be accomplished simultaneously or if desired, only one may be accomplished then followed by the other. To obtain the desired looseness, it is desirable that the length of the fiber between the two locations of the fastening means S1 and S2 is made noticeably greater than the critical maximum distance of these locations on the tube so that the buckling length at which the glass fiber in accordance with its thinness of the glass cross-section and the modulus of elasticity of the glass can still just barely buckle given longitudinal compressive strains SP. When the distance between the locations on the tube amounts, for example, to 8 mm, then the critical buckling length for the glass fiber suspended between the two locations should be noticeably greater than 8 mm, for example, 12 mm, such as illustrated in FIG. 2. It is also possible for the length of the fiber to be even greater. The glass fiber extending between the two locations for the securing means can then be compressed by a very low compressive force SP because the glass fiber then immediately loses its sag by snaking loosely inside of the protective tube.

In the second possible measure, it is particularly useful when, for example, one of the two means for securing such as the securing means S1 which is preferably adjacent to the taper S is produced by an inelastic means, for example, by use of solder metal while the other means for securing S2 in this case is produced with a highly elastic means, for example, of silicone rubber. Since the highly elastic fastening or connection can yield, the longitudinal strains SP on the glass fiber remain slight even at high temperatures.

An additional feature which is illustrated in FIGS. 1 and 2 is that the glass fiber is surrounded by a spacing member AK in the proximity of the taper S. Thus, the fiber has the spacing member AK at approximately the end which is to be positioned relative to the component. The spacing member AK is likewise secured to the first tube end VR, for example, by means of a solder compound. The spacing member AK serves to position the taper S relative to the tube end VR. The outside diameter of the spacing member AK is somewhat smaller, for example, about 3 to 15% smaller than the inside diameter of the protective tube R when spaced away from the end VR which as illustrated has a slightly inwardly extending curve. Thus, the spacing member AK and the taper S of the last fiber can be pushed into and through the tube R proceeding from the right with a narrow clearance between the inside surface of the tube on the one hand and the glass fiber L, respectively, in the spacing member AK on the other hand, for example, by means of a thrust of a high pressure gas agent. This pushing with a gas agent clearly reduces the risk of contaminating and/or damaging the taper S until the taper S of the fiber L finally projects out of the tube R at the tube end VR. The spacing member AK is explained in greater detail in and of itself in the simultaneously filed German application No. P 34 05 803.6. After the spacer AK has been secured in the protective tube R, for example, by a solder compound, the member AK serves in the invention as one of the two glass fastenings or securing means S1 or S2.

As indicated in FIG. 3, the protective tube R with the fiber is particularly utilized in an arrangement where it extends through a wall opening W in a housing formed by a can G with a lid K for an opto-electronic module and the tube is then directly or indirectly secured to the housing of the module. The tip S of the glass fiber projects from the first tube end VR in the inside of the housing and is directed to the optically active location of the opto-electronic component D which is attached on the inside of the module housing.

In order to be certain that the glass fiber L is not under any longitudinal tensile stresses SP at the maximum operating or respective storage temperatures, one of the means for securing such as S1 or S2 can be fastened and then followed by the other. In another embodiment of the method, both fastening means S1 and S2 can be produced simultaneously. In both embodiments, the securing is preferably accomplished while the tube R and the fiber are at a temperature exceeding the maximum or upper temperature limit. For example, if the maximum temperature limit is 65° C., then the tube R and the fiber L are placed at an ambient temperature which is higher, for example, at 80° C. After forming the connections by the means for securing and after allowing the arrangement to cool to the maximum temperature limit, it is certain that the fiber will not be under any strong shearing forces and will not be overstretched.

Although various minor modifications may be suggested by those versed in the art, it should be understood that I wish to embody within the scope of the patent granted hereon, all such modifications as reasonably and properly come within the scope of my contribution to the art.

I claim:

1. In a protective tube arrangement for a glass fiber, said tube arrangement being particularly useful for mounting in a housing of a module, said tube arrangement including a glass fiber having a taper at one end and being positioned in a stiff protective tube with the tube surrounding and protecting the glass fiber and holding it in alignment with the taper extending from one end of the tube, and the module having an operating temperature and a storage temperature which have a maximum temperature limit and a minimum temperature limit, the improvements comprising stiff first means for securing the fiber in the proximity of the taper to the tube at a first location and second means for securing the fiber to the tube at a second location spaced from the first location with the fiber being free of any means for securing between the first and second locations, said locations on the tube and on the glass fiber being selected with the length of the fiber between the first and second locations being greater than the distance of the tube between the locations at any temperature below the maximum temperature limit so that the fiber is substantially free of tensile stresses and said length and distance are selected so that at a temperature below the maximum temperature limit and above the minimum temperature limit, the glass fiber hangs loosely in the tube between the two locations and the only stresses on the fiber are axially directed compressive stresses of below $1 \text{ N/mm}^2$ so that no triggering of creep even over a long period of time will occur to cause misalignment and damage.

2. In a protective tube arrangement according to claim 1, wherein the location for the first means and second means is at the ends of the protective tube and preferably at an inside surface of the tube at the ends.

3. In a protective tube arrangement according to claim 1, wherein the length of the fiber between the two locations for the first and second means for securing amounts to noticeably more than the critical buckling length and is substantially greater than the distance between the two locations on the tube.

4. In a protective tube arrangement according to claim 3, wherein the distance between the two locations on the tube is 8 mm and the length of the fiber between the two locations is substantially more.

5. In a protective tube arrangement according to claim 3, wherein one of the first and second means for securing utilizes metal solder to form a connection between the fiber and the tube and the other of said first and second means for securing utilizes a highly elastic material to form the connection.

6. In a protective tube arrangement according to claim 5, wherein the highly elastic material is silicone rubber.

7. In a protective tube arrangement according to claim 1, wherein one of the first and second means for securing utilizes metal solder to form a connection between the tube and the fiber and the other of said first and second means for securing utilizes a highly elastic material of silicone rubber to form the connection.

8. In a protective tube arrangement according to claim 1, which includes a spacing member surrounding the fiber adjacent one end of the tube, said first means for securing securing the spacing member to the end of the tube as it secures the fiber to the tube.

9. In a protective tube arrangement according to claim 8, wherein the first securing means utilizes metal solder to form the connection between the spacing member, fiber and tube and wherein the second means for securing utilizes an elastic material of silicone rubber to connect the fiber to the other end of the protective tube.

10. In a protective tube arrangement according to claim 1, wherein the module has a housing with an opening in a wall, said protective tube arrangement being mounted in the opening with the taper of the fiber being positioned at a desired position relative to an optically active component of the module.

11. In a method of producing a protective tube arrangement with an optical fiber being secured within a protective tube at only two spaced locations, the length of the fiber between the two spaced locations at a temperature below a maximum temperature limit being greater than the distance between the two locations on the tube so that the fiber hangs loosely within the tube, said method comprising positioning of fiber within the tube, forming two connections between the tube and fiber by securing the fiber at each of the two spaced locations and while securing the fiber at the two spaced locations, maintaining the tube and fiber at a temperature above the maximum temperature limit so that upon cooling to the maximum temperature limit after formation of the two connections, said fiber is not under tensile stresses.

* * * * *